(12) United States Patent
Wang et al.

(10) Patent No.: US 10,284,359 B2
(45) Date of Patent: May 7, 2019

(54) CLOCK SYNCHRONIZATION FREQUENCY OFFSET ESTIMATION METHOD ADAPTED TO WIA-PA NETWORK

(71) Applicant: Chongqing University of Posts and Telecommunications, Chongqing (CN)

(72) Inventors: Ping Wang, Chongqing (CN); Heng Wang, Chongqing (CN); Haiyong Zeng, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 15/512,331

(22) PCT Filed: Mar. 29, 2016

(86) PCT No.: PCT/CN2016/077761
§ 371 (c)(1),
(2) Date: Mar. 17, 2017

(87) PCT Pub. No.: WO2016/173358
PCT Pub. Date: Nov. 3, 2016

(65) Prior Publication Data
US 2018/0041329 A1 Feb. 8, 2018

(30) Foreign Application Priority Data
Apr. 29, 2015 (CN) .......................... 2015 1 0212566

(51) Int. Cl.
| | |
|---|---|
| *H04L 7/00* | (2006.01) |
| *H04L 7/06* | (2006.01) |
| *H04Q 9/04* | (2006.01) |
| *H04W 4/00* | (2018.01) |
| *H04W 56/00* | (2009.01) |

(52) U.S. Cl.
CPC .............. *H04L 7/0012* (2013.01); *H04L 7/06* (2013.01); *H04Q 9/04* (2013.01); *H04W 4/00* (2013.01);
(Continued)

(58) Field of Classification Search
CPC ...... H04L 7/0012; H04L 7/06; H04L 12/2861
See application file for complete search history.

(56) References Cited

U.S. PATENT DOCUMENTS

| | | | |
|---|---|---|---|
| 2010/0157975 A1 | 6/2010 | In et al. | |
| 2016/0174016 A1* | 6/2016 | Moon | H04W 4/005 370/329 |
| 2017/0033833 A1* | 2/2017 | Terry | H04B 1/7136 |

FOREIGN PATENT DOCUMENTS

| | | | |
|---|---|---|---|
| CN | 103812595 A | 5/2014 | |
| CN | 104968043 A | 10/2015 | |

OTHER PUBLICATIONS

The World Intellectual Property Organization (WIPO) International Search Report for PCT/CN2016/077761 dated Jun. 22, 2016 5 Pages.
(Continued)

*Primary Examiner* — Kabir A Timory
(74) *Attorney, Agent, or Firm* — Anova Law Group, PLLC

(57) ABSTRACT

The present invention claims a clock synchronization frequency offset estimation method adapted to a WIA-PA network, and belongs to the technical field of industrial wireless sensor networks. The method comprises the following steps: A. receiving a beacon frame, broadcast by a time source device, by a child node in the WIA-PA network in each time synchronization period to obtain a sending timestamp and a receiving timestamp, then adjusting a local time by taking a difference value between the two timestamps as a time adjustment quantity, repeating the process
(Continued)

above, and after a plurality of synchronization periods, separately estimating a frequency offset with a statistical signal estimation method; and B. when anode is required to report its own time, compensating a node time with the estimated relative frequency offset. With the method, the time synchronization precision is effectively increased, a synchronization error is restrained from freely increasing in the time synchronization period, the synchronization period is prolonged, and both the communication overhead of the network and the energy consumption of the node are reduced.

4 Claims, 2 Drawing Sheets

(52) U.S. Cl.
CPC ......... *H04W 56/0035* (2013.01); *Y02D 70/00* (2018.01); *Y02D 70/144* (2018.01)

(56) References Cited

OTHER PUBLICATIONS

Tao, Zhi-Yong, Hu, Ming, Time Synchronization Algorithm Based on Hierarchical Structure in Wireless Sensor Network, Journal of Computer Applications, Jun. 1, 2012, China.

* cited by examiner

CLOCK SYNCHRONIZATION FREQUENCY OFFSET ESTIMATION METHOD ADAPTED TO WIA-PA NETWORK

BACKGROUND OF THE INVENTION

1. Technical Field

The present invention relates to the technical field of industrial wireless sensor networks, and in particular to a clock synchronization frequency offset estimation method adapted to a WIA-PA network.

2. Description of Related Art

An industrial wireless sensor network features low power consumption and low cost, and has become a hotspot as to the development direction in the industrial control field. The WIA-PA (Wireless Networks for Industrial Automation Process Automation) standard is based on the IEEE 802.15.4 standard for short-range wireless communications, and the data link layer of the WIA-PA is compatible with and expands a superframe structure in IEEE 802.15.4. The data link layer of the WIA-PA supports a time slot based frequency hopping, retransmission, CSMA and TDMA mixed channel access mechanisms, thereby guaranteeing the reliability and real-time capability for the transmission. Therefore, to guarantee the reliability of the TDMA mechanism, it is extremely important to perform time synchronization on the devices in the WIA-PA network.

According to different recording manners of the time information in a time synchronization process, the time synchronization methods for the wireless sensor networks can be divided into the following three classes: a one-way based synchronization algorithm, a two-way message exchange based synchronization algorithm, and a receiver-receiver based synchronization algorithm. The one-way based synchronization algorithm mainly includes an FTSP algorithm and a DMTS algorithm, the two-way message exchange based algorithm mainly includes an LTS algorithm and a TPSN algorithm, and the receiver-receiver based synchronization algorithm mainly refers to an RBS algorithm. The time synchronization mechanism of the WIA-PA network mainly involves beacon frame synchronization and command frame synchronization, where a child device receives a beacon frame attached with time information, which is broadcast periodically by a time source, records a local time when the beacon frame is received, and simply compares the two times to obtain a clock offset between the present device clock and a standard clock, thereby adjusting the local clock with the clock offset; and moreover, secondary synchronization can also be performed with a dedicated time synchronization command frame of the WIA-PA network.

In the WIA-PA network, the transmission of a message is necessary to complete the time synchronization between nodes, however, various delays in message transceiving have an important effect on the precision of the time synchronization. FIG. 1 provides an exploded diagram of a time delay in a message transceiving process. As shown in FIG. 1, to better analyze an error in the message transmission, the time delay for message transceiving can be divided into six parts, i.e. send time, access time, transmission time, propagation time, reception time and receive time, which are key factors affecting the time synchronization.

At present, the time synchronization mechanism of the WIA-PA network has the following major problems: first, the clock offset is simply estimated only in a current beacon frame synchronization mechanism without estimating and compensating the more important frequency offset, resulting in that time errors rapidly accumulate in a time interval of the synchronization period, and the time source has to increase the broadcast frequency of the beacon frame to maintain the basic time synchronization precision of the network; second, in a time parameter estimation process, the effects of the six types of delays, including send time, access time, transmission time, propagation time, reception time and receive time, on an estimation result in the message transceiving process not being excluded, resulting in a larger deviation between the adjusted time and the standard time, and the reduction of synchronization precision; and finally, a general clock offset and frequency offset joint estimation method has the defects of high computation burden and higher complexity, and the situation, which is more conforming to an actual scene, that the child node compensates the local time in each synchronization period and then separately estimates the relative frequency offset as provided by the present invention is rarely taken into consideration.

BRIEF SUMMARY OF THE INVENTION

Specific to the problems in the prior art, the present invention provides a clock synchronization frequency offset estimation method adapted to a WIA-PA network, for increasing the time synchronization precision of the WIA-PA network, prolonging the time synchronization period, reducing the broadcast frequency of the beacon frame, reducing the communication overhead of the network and the energy consumption of the node. A technical solution of the present invention is as follows: a clock synchronization frequency offset estimation method adapted to a WIA-PA network, comprising the following steps:

101. receiving a beacon frame, broadcast periodically by a time source device A, by a child node P in an industrial wireless sensor network WIA-PA to obtain a time $T_{1,i}^{(A)}$ at which the time source device A sends the beacon frame and a time $T_{2,i}^{(P)}$ when the child node P receives the beacon frame from the received beacon frame, calculating a difference value $\Delta T_i = T_{2,i}^{(P)} - T_{1,i}^{(A)}$ between the two as a time adjustment quantity, and subtracting the time adjustment quantity $\Delta T_i$ from a subsequent time $T_{5,i}^{(P)}$ to obtain a time as its own local time for the child node P; and repeating the above process, and after N synchronization periods, separately estimating a frequency offset $\hat{\rho}^{(AP)}$ of a local clock relative to a time source with a frequency offset estimation formula; and

102. when a time needs to be reported, converting the local time into a current time of the node P by the child node P using the estimated relative frequency offset $\hat{\rho}^{(AP)}$ according to the formula $(1+\hat{\rho}^{(AP)})^{-1}(t-\Delta T_i)$, and reporting the current time of the node P.

Further, when time synchronization is required to be implemented between the time source device A and the child node P in Step 101, the time source device A is taken as a time reference node, the child node P is a node to be synchronized, and the time synchronization step comprises the following steps:

A0. generating a beacon frame by a MAC layer of the node A, reserving a sending timestamp position in the beacon frame, performing interruption when the node A transmits the beacon frame to a delimiter SFD (i.e., single frequency dialling), and adding a sending timestamp into the reserved sending timestamp position in the beacon frame; and periodically broadcasting the beacon frame by the node A through a wireless interface;

A1. receiving the beacon frame by a MAC layer of the child node P, recording a receiving timestamp under SFD interruption and assigning a value to a variable $T_{2,i}^{(P)}$, and analyzing the beacon frame to obtain the sending timestamp and assigning a value to a variable $T_{1,i}^{(A)}$, wherein $T_{2,i}^{(P)}$ represents a time when the child node P receives the beacon frame, and $T_{1,i}^{(A)}$ represents a time when the time source device A sends the beacon frame;

A2. calculating a time adjustment quantity $\Delta T_i$ by an application layer of the node P according to a formula $\Delta T_i = T_{2,i}^{(P)} - T_{1,i}^{(A)}$, and adjusting its own local time at a subsequent time $T_{5,i}^{(P)}$, i.e. subtracting the adjustment amount $\Delta T_i$ from the current local time to obtain a time as a new time; and A3. repeating Steps A1 and A2, preserving a point $(T_{1,i}^{(A)}, T_{2,i}^{(P)})$ to a corresponding array, and after N periods, estimating a frequency offset $\hat{\rho}^{(AP)}$ of the node P relative to the node A by the application layer of the node P according to a frequency offset estimation formula $$\hat{\rho}^{(AP)} = \frac{\sum_{i=1}^{N} \left[ (T_{2,i}^{(P)} - T_{1,i}^{(A)})(T_{1,i}^{(A)} - T_{2,i-1}^{(P)}) + (T_{2,i}^{(P)} - T_{1,i}^{(A)})^2 \right]}{\sum_{i=1}^{N} \left[ (T_{1,i}^{(A)} - T_{2,i-1}^{(P)})^2 + (T_{2,i}^{(P)} - T_{1,i}^{(A)})(T_{1,i}^{(A)} - T_{2,i-1}^{(P)}) \right]},$$

wherein in the formula, $T_{1,i}^{(A)}$ is the time when the node A sends an ith beacon frame, $T_{2,i}^{(P)}$ is a time when the node P receives the ith beacon frame, $T_{2,i-1}^{(P)}$ is a time when the node P receives the (i-1)th beacon frame, and N is the number of time synchronization.

Further, in Step A0, the beacon frame is sent in a broadcast manner, a source address of the beacon frame is an address of the node A, and a time synchronization mechanism of the beacon frame is the time synchronization of a one-way message.

Further, in Step 101, N is 1, that is, for a first synchronization period, $T_{2,1}^{(P)}$ can be expressed as:

$$T_{2,1}^{(P)} = T_{1,1}^{(A)} + \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)})$$

wherein $\rho^{(AP)}$ and $\theta_{t_0}^{(AP)}$ are the relative frequency offset and the initial clock offset at a time $t_0$ respectively, a fixed delay in a beacon frame transceiving process is $d^{(AP)}$, a random delay is $X_i^{(AP)}$, $\rho^{(AP)}(d^{(AP)} + X_1^{(AP)})$ represents a synchronization error accumulated due to the frequency offset in the beacon frame transceiving process, the node P adjusts the local time using a difference value $\Delta T_1 = (T_{2,1}^{(P)} - T_{1,1}^{(A)})$ between the two timestamps at a subsequent time $T_{5,i}^{(P)}$, and the time adjusted by the node P can be expressed with $T_{5,1}^{(P)*}$, thereby obtaining $$\Delta T_1 = T_{2,1}^{(P)} - T_{1,1}^{(A)} = \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)}) \quad (1)$$

$$T_{5,1}^{(P)*} = T_{5,1}^{(P)} + T_{2,1}^{(P)} - T_{1,1}^{(A)} \quad (2)$$

in a time from $t_0$ to $T_{5,1}^{(A)}$, a real clock offset quantity $\Delta T_{true,1}$ generated between the node A and the node P is $$\Delta T_{true,1} = \theta_{t_0}^{(AP)} + \rho^{(AP)}(T_{5,1}^{(P)} - t_0) \quad (3)$$

a new clock offset quantity $\theta_{t_1}^{(AP)}$ adjusted by the node P is obtained by (3)-(1), $$\theta_{t_1}^{(AP)} = \Delta T_{true,1} - \Delta T_1 = \rho^{(AP)}(T_{5,1}^{(P)} - T_{1,1}^{(A)}) - (1 + \rho^{(AP)})(d^{(AP)} + X_1^{(AP)}) \quad (4)$$

supposing the time of the node A corresponding to the time $T_{5,1}^{(P)*}$ is $T_{5,1}^{(A)*}$, at this point, the node A and the node P are very close in time since the local time of the node P is just adjusted, therefore, $T_{5,1}^{(P)*} = T_{5,1}^{(A)*}$ can be established.

The present invention has the following advantages and beneficial effects:

1. According to the clock synchronization frequency offset estimation method adapted to the WIA-PA network provided by the present invention, the child node adjusts the local time after receiving the beacon frame in each synchronization period, and separately estimates the relative frequency offset after a plurality of synchronization periods, therefore, the accumulated synchronization errors is reduced in the time synchronization period, the time synchronization precision is effectively increased, the synchronization period is prolonged, and both the communication overhead of the network and the energy consumption of the node are reduced.

2. The present invention not only takes the six types of delays, including send time, access time, transmission time, propagation time, reception time and receive time, in the message receiving process into full consideration in the frequency offset estimation process, but also addresses the accumulated synchronization errors caused by the frequency offset in the beacon frame transceiving process, so that a synchronization model is more conforming to an actual condition, and an estimation result is more accurate.

3. According to the clock synchronization frequency offset estimation method adapted to the WIA-PA network provided by the present invention, a frequency offset estimation expression is only related to the sending timestamp $T_{1,i}^{(A)}$ and the receiving timestamp $T_{2,i}^{(P)}$ and is not affected by the time adjustment time $T_{5,1}^{(P)}$ and the fixed delay $d^{(AP)}$. Therefore, the relative frequency offset can be estimated effectively with only two types of timestamps, i.e. $\{T_{1,i}^{(A)}, T_{2,i}^{(P)}\}_{i=1}^{N}$, and the advantages of simple calculation and novel method are achieved.

4. The present invention takes the situation where the child node adjusts the local time in each period and separately estimates the frequency offset finally into consideration, and the clock offset and frequency offset joint estimation method is not needed, thereby reducing the number of the parameters to be estimated and the estimation complexity, therefore, the method provided by the present invention is more conforming to the actual scene.

DETAILED DESCRIPTION OF THE INVENTION

The present invention will be further illustrated below in combination with the accompanying drawings.

The core concept of the present invention is as follows: based on the beacon frame broadcast in one way, the sending time and receiving time of the beacon frame are recorded, a difference value between the two is taken as a time adjustment quantity for adjusting the local time, and after such process is executed for a plurality of periods, the statistical signal estimation method is used to separately estimate the frequency offset for compensating the local time of the node, thereby reducing the accumulated synchronization errors in the period of time between two synchronization periods, and effectively increasing the time synchronization precision of the WIA-PA beacon frame.

Figure 1:
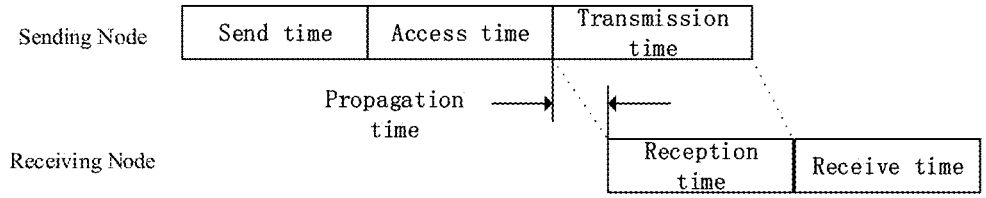
FIG. 1 is an exploded diagram of a message transceiving delay.
Figure 2:
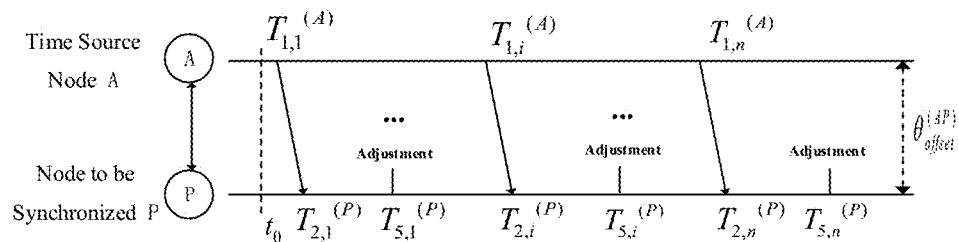
FIG. 2 is a schematic diagram of beacon frame synchronization provided by the present invention.
Figure 3:
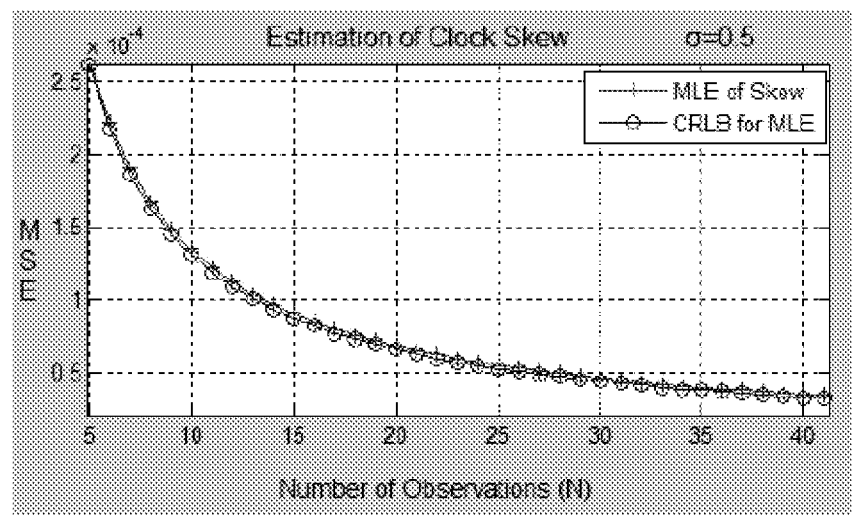
FIG. 3 is a diagram showing a performance comparison of frequency offset estimation results provided by the present invention.

FIG. 2 is a schematic diagram of beacon frame synchronization provided by the present invention. A node A is a time source, and a node P is a node to be synchronized, $t_0$ is a start time of the time synchronization, and a sending timestamp and a receiving timestamp of the beacon frame are $T_{1,i}^{(A)}$ and $T_{2,i}^{(P)}$ respectively.

For a first synchronization period, $T_{2,1}^{(P)}$ can be expressed as:

$$T_{2,1}^{(P)} = T_{1,1}^{(A)} + \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)})$$

wherein $\rho^{(AP)}$ and $\theta_{t_0}^{(AP)}$ are the relative frequency offset and the initial clock offset at a time $t_0$ respectively, a fixed delay in a beacon transceiving process is $d^{(AP)}$, a random delay is $X_i^{(AP)}$, and $\rho^{(AP)}(d^{(AP)} + X_1^{(AP)})$ represents a synchronization error accumulated due to the frequency offset in the beacon transceiving process. The node P adjusts the local time using a difference value $\Delta T_1 = (T_{2,1}^{(P)} - T_{1,1}^{(A)})$ between the two timestamps at a subsequent time $T_{5,i}^{(P)}$, and the time adjusted by the node P can be expressed with $T_{5,1}^{(P)*}$, thereby obtaining $$\Delta T_1 = T_{2,1}^{(P)} - T_{1,1}^{(A)} = \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)}) \quad (1)$$

$$T_{5,1}^{(P)*} = T_{5,1}^{(P)} + T_{2,1}^{(P)} - T_{1,1}^{(A)} \quad (2)$$

In fact, in a period of time from $t_0$ to $T_{5,1}^{(A)}$, a real clock offset quantity $\Delta T_{true,1}$ generated between the node A and the node P is $$\Delta T_{true,1} = \theta_{t_0}^{(AP)} + \rho^{(AP)}(T_{5,1}^{(P)} - t_0) \quad (3)$$

A new clock offset quantity $\theta_{t_1}^{(AP)}$ adjusted by the node P is obtained by (3)-(1) as follows $$\theta_{t_1}^{(AP)} = \Delta T_{true,1} - \Delta T_1 = \rho^{(AP)}(T_{5,1}^{(P)} - T_{1,1}^{(A)}) - (1+\rho^{(AP)})(d^{(AP)} + X_1^{(AP)}) \quad (4)$$

Supposing the time of the node A corresponding to the time $T_{5,1}^{(P)*}$ is $T_{5,1}^{(A)*}$, at this point, the node A and the node P are very close in time since the local time of the node P is just adjusted, therefore, $T_{5,1}^{(P)*} = T_{5,1}^{(A)*}$ can be established.

In a second period following, the time adjustment quantity $\Delta T_2$ of the node P can be solved as $$\Delta T_2 = T_{2,2}^{(P)} - T_{1,2}^{(A)} = \theta_{t_1}^{(AP)} + \rho^{(AP)}(T_{1,2}^{(A)} - T_{5,1}^{(A)*}) + d^{(AP)} + X_2^{(AP)} + \rho^{(AP)}(d^{(AP)} + X_2^{(AP)}) \quad (5)$$

$\theta_{t_1}^{(AP)}$ and $T_{5,1}^{(A)*}$ are substituted into the formula above to obtain $$\Delta T_2 = T_{2,2}^{(P)} - T_{1,2}^{(A)} = \rho^{(AP)}(T_{1,2}^{(A)} - T_{2,1}^{(P)} + X_2^{(AP)} - X_1^{(AP)}) + X_2^{(AP)} - X_1^{(AP)}) \quad (6)$$

In fact, in a period of time from $T_{5,1}^{(P)*}$ to $T_{5,2}^{(P)}$, a real clock offset quantity $\Delta T_{true,2}$ between the node A and the node P can be expressed as $$\Delta T_{true,2} = \theta_{t_1}^{(AP)} + \rho^{(AP)}(T_{5,2}^{(P)} - T_{5,1}^{(P)*}) \quad (7)$$

A new clock offset quantity $\theta_{t_2}^{(AP)}$ of the node P after the second adjustment time is obtained by (7)-(6) as follows $$\theta_{t_2}^{(AP)} = \Delta T_{true,2} - \Delta T_2 = \rho^{(AP)}(T_{5,2}^{(P)} - T_{1,2}^{(A)}) - (1+\rho^{(AP)})(d^{(AP)} + X_1^{(AP)})$$

TABLE 1

Parameters in time synchronization

| | Period (N) | | | | |
|---|---|---|---|---|---|
| | 1 | 2 | 3 | ... | i + 1 |
| Reference time | $t_0$ | $T_{5,1}^{(A)*}$ | $T_{5,2}^{(A)*}$ | ... | $T_{5,i}^{(A)*}$ |
| Initial offset quantity | $\theta_{t_0}^{(AP)}$ | $\theta_{t_1}^{(AP)}$ | $\theta_{t_2}^{(AP)}$ | ... | $\theta_{t_i}^{(AP)}$ |
| Adjustment time | $T_{5,1}^{(P)}$ | $T_{5,2}^{(P)}$ | $T_{5,3}^{(P)}$ | | $T_{5,i+1}^{(P)*}$ |

Table 1 lists the relevant parameters in a time synchronization period, including reference time, adjustment time, and initial offset quantity. As can be known from (4), the initial offset quantity $\theta_{t_i}^{(AP)}$ contains the adjustment time $T_{5,i-1}^{(P)*}$ and the fixed delay $d^{(AP)}$ of the last period, however, in a process of calculating the time adjustment quantity $\Delta T_i$ in Formula (6), the two parameters are canceled out, therefore, the final expression does not contain the adjustment time $T_{5,i}^{(P)*}$ and the fixed delay $d^{(AP)}$.

For a third period, the time adjustment quantity $\Delta T_3$ can be solved as $$T_{2,3}^{(P)} - T_{1,3}^{(A)} = \rho^{(AP)}(T_{1,3}^{(A)} - T_{2,2}^{(P)}) + (1+\rho^{(AP)})(X_3^{(AP)} - X_2^{(AP)})$$

By repeating the steps above, the time adjustment quantity of the ith period is $$T_{2,i}^{(P)} - T_{1,i}^{(A)} = \rho^{(AP)}(T_{1,i}^{(A)} - T_{2,i-1}^{(P)}) + (1+\rho^{(AP)})(X_i^{(AP)} - X_{i-1}^{(AP)}) = \rho^{(AP)}(T_{1,i}^{(A)} - T_{2,i-1}^{(P)}) + (1+\rho^{(AP)})W_i \quad (8)$$

Thereunto, $W_i$ is a Gaussian white noise with a mean value of 0 and a variance of $\sigma^2$. The frequency offset $\rho^{(AP)}$ is estimated with a maximum likelihood estimation method, and a log-likelihood function based on an observed quantity $\{T_{2,i}^{(P)}, T_{1,i}^{(A)}\}_{i=1}^{N}$ in Formula (8) can be expressed as $$\ln L(\rho^{(AP)}, \sigma^2) = \quad (9)$$

$$-\frac{N}{2}\ln(2\pi\sigma^2) - \frac{1}{2\sigma^2}\sum_{i=1}^{N}\left(\frac{T_{2,i}^{(P)} - T_{1,i}^{(A)} - \rho^{(AP)}(T_{1,i}^{(A)} - T_{2,i-1}^{(P)})}{1+\rho^{(AP)}}\right)^2$$

A partial derivative is solved for $\rho^{(AP)}$ and is made to be 0 as follows $$\frac{\partial \ln L(\rho^{(AP)}, \sigma^2)}{\partial \rho^{(AP)}} =$$

$$\frac{\sum_{i=1}^{N}[(T_{2,i}^{(P)} - T_{1,i}^{(A)} - \rho^{(AP)}(T_{1,i}^{(A)} - T_{2,i-1}^{(P)}))(T_{2,i}^{(P)} - T_{2,i-1}^{(P)})]}{\sigma^2(1+\rho^{(AP)})^3} = 0$$

thereby obtaining a solution as follows $$\hat{\rho}^{(AP)} = \frac{\sum_{i=1}^{N}\left[(T_{2,i}^{(P)} - T_{1,i}^{(A)})(T_{1,i}^{(A)} - T_{2,i-1}^{(P)}) + (T_{2,i}^{(P)} - T_{1,i}^{(A)})^2\right]}{\sum_{i=1}^{N}\left[(T_{1,i}^{(A)} - T_{2,i-1}^{(P)})^2 + (T_{2,i}^{(P)} - T_{1,i}^{(A)})(T_{1,i}^{(A)} - T_{2,i-1}^{(P)})\right]} \quad (10)$$

As can be obtained from the formula above, the frequency offset $\hat{\rho}^{(AP)}$ is irrelevant to the adjustment time $T_{5,2}^{(P)}$ and and the fixed delay $d^{(AP)}$, the node P only needs to obtain the sending timestamp $\{T_{1,i}^{(A)}\}_{i=1}^{N}$ and the receiving timestamp $\{T_{2,i}^{(P)}\}_{i=1}^{N}$ to possibly estimate the frequency offset, and the advantages of the novel method and calculation simplicity are achieved. In addition, the node P does not need to conduct joint estimation on the clock offset and the frequency offset, and the synchronization with the node A can be implemented just by separately estimating the frequency offset, thereby reducing the calculation amount and the complexity.

To verify the effectiveness of the estimation results, a lower limit of CRLB (Cramer-Rao Lower Bound) of $\hat{\rho}^{(AP)}$ can be solved as follows $$\mathrm{Var}(\hat{\rho}^{(AP)}) \geq \frac{\sigma^2(1+\rho^{(AP)})^2}{\sum_{i=1}^{N}(T_{1,i}^{(A)} - T_{2,i-1}^{(P)})^2 + N\sigma^2}$$

FIG. 2 provides a diagram showing the performance comparison of the MSE (Mean Square Error) and CRLB of $\hat{\rho}^{(AP)}$. As can be seen from FIG. 2, the two curves are very close, and an MSE curve of $\hat{\rho}^{(AP)}$ is always above that of CRLB, indicating that the estimation result $\hat{\rho}^{(AP)}$ is effective and approximate to a minimum-variance unbiased estimator, and the accuracy is higher.

Embodiments

Figure 4:
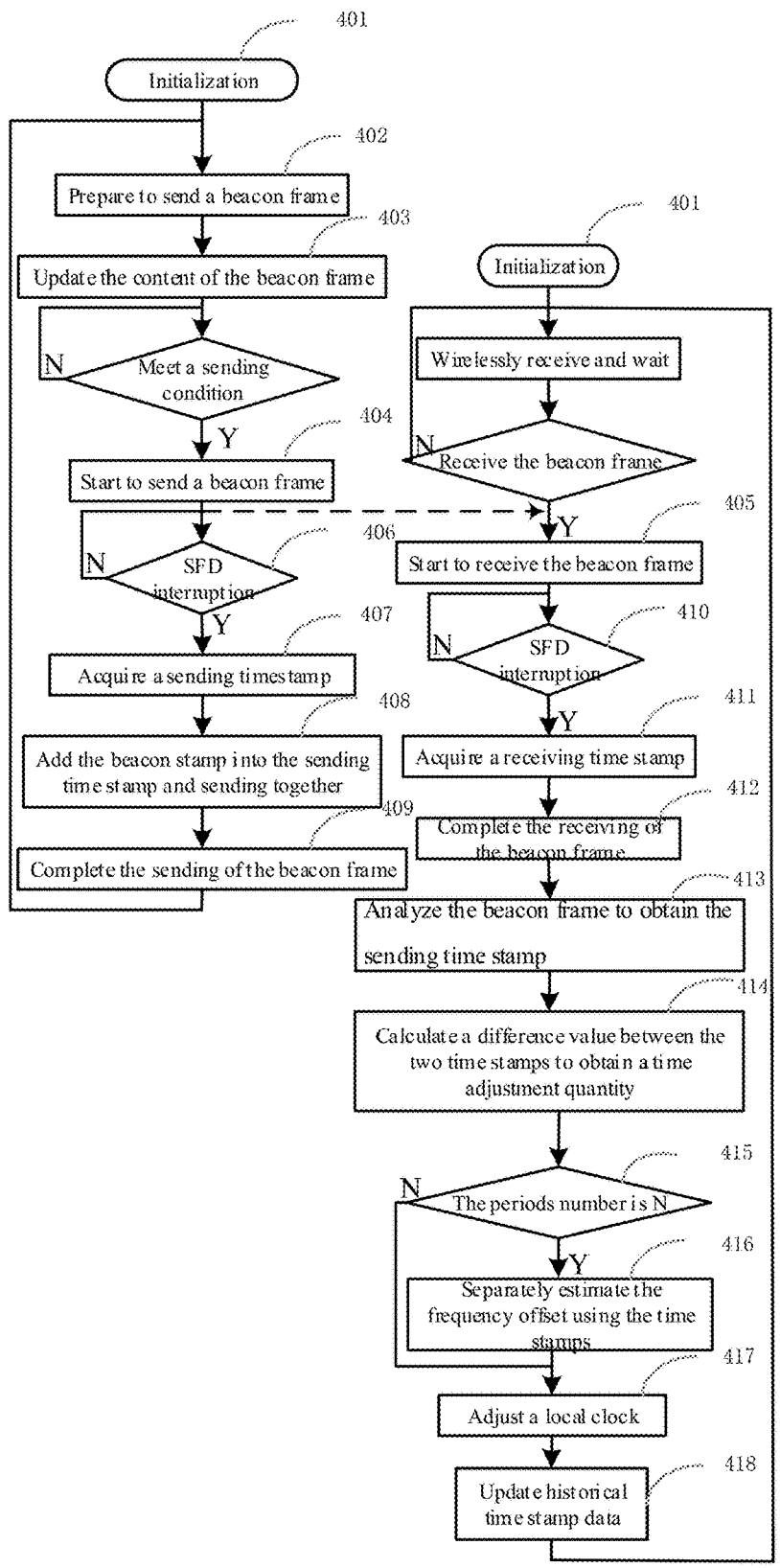
FIG. 4 is a flowchart of a frequency offset estimation method provided by the present invention.

Based on the principle of the present invention above, FIG. 4 shows a flowchart of the implementation of the clock synchronization frequency offset estimation method adapted to the WIA-PA network clock provided by the present invention.

Step 401 is an initial action. In Step 402, a source node constructs a lead code and other parts of a beacon frame and updates the content of the beacon frame, and in Step 403, whether a beacon frame sending condition is met is judged, if not in Step 403, waiting continues, and if so in Step 403, the beacon frame is started to be sent in Step 404.

In Step 405, a child node detects the beacon frame after wireless receiving and waiting, and starts to receive the beacon frame. In Steps 406 and 407, when the source node sends the beacon frame to the delimiter SFD, an interruption occurs, and then, in Step 408, the source node adds the sending timestamp into a reserved timestamp position in the beacon frame. As the transmission speed is 250 kbps at the frequency band of 2.4 G in the IEEE 802.15.4 protocol, with 4 microseconds per bit, the running of an interruption program is ended when it is the timestamp part to be sent, the timestamp has been added to the reserved position, and the interruption and timestamp addition process and the sending process have no effect on each other. In Step 409, the source node sets a sending flag bit as 0, and Step 401 is returned to after the completion of the sending of the beacon frame. In Steps 410 and 411, when the child node receives the beacon frame, a receiving timestamp is recorded and preserved under SFD interruption, and then, in Step 412, a receiving flag bit is set, and the receiving of the beacon frame is completed. In Step 413, the child node analyzes the beacon frame to obtain the sending timestamp, and preserves the sending timestamp in a corresponding array, and then, in Step 414, a difference value between the sending timestamp and the receiving timestamp is calculated and used as a current time adjustment quantity. In Step 415, the child node records the number of the r if not in eceived beacon frame and judges whether a period number (i.e. the number of the received beacon frame) is a given value N; Step 415, Step 417 is executed and the time adjustment quantity is used to adjust the local clock; if so in Step 415, the child node separately estimates the relative frequency offset using the recorded historic timestamp data according to Formula (10) provided in the present invention in Step 416; and then in Step 417, the time adjustment quantity is used to adjust the local clock and compensate the frequency offset simultaneously. In Step 418, the historic timestamp data are updated, the period number is set to be 0, and Step 401 is returned to.

The embodiments above shall be construed to illustrating the present invention only, instead of limiting the protection scope of the present invention. After reading the described contents of the present invention, those skilled in the art may make various variations or alternations to the present invention, and these equivalent changes or modifications shall likewise fall within the scope defined by the claims of the present invention.

What is claimed is:

1. A clock synchronization frequency offset estimation method adapted to a wireless networks for industrial automation process automation (WIA-PA) network, the method comprising:
    101. receiving a beacon frame, broadcast periodically from a time source device A, by a child node P in an industrial wireless sensor network WIA-PA to obtain a time $T_{1,i}^{(A)}$, wherein $T_{1,i}^{(A)}$ denotes a time when the time source device A sends an ith beacon frame, and a time $T_{2,i}^{(P)}$, wherein $T_{2,i}^{(P)}$ denotes a time when the child node P receives the ith beacon frame from the received beacon frame, calculating a difference value between the time $T_{1,i}^{(A)}$ and the time $T_{2,i}^{(P)}$ as a time adjustment quantity $\Delta T_i$, wherein $\Delta T_i = T_{2,i}^{(P)} - T_{1,i}^{(A)}$, and subtracting the time adjustment quantity $\Delta T_i$ from a subsequent time $T_{5,i}^{(P)}$ to obtain a time as a new local time t for the child node P; and repeating the above process, and after N synchronization periods, wherein N is a positive integer, separately estimating a frequency offset $\hat{\rho}^{(AP)}$ of a local clock relative to a time source with a frequency offset estimation formula; and
    102. when a time needs to be reported, converting, by the child node P, the new local time t into a current time of a node P using an estimated relative frequency offset $\hat{\rho}^{(AP)}$ according to a formula $(1+\hat{\rho}^{(AP)})^{-1}(t-\Delta T_i)$, and reporting the current time of the node P, such that:
    the child node P adjusts the local time after receiving the beacon frame in each of the N synchronization periods, and separately estimates the relative frequency offset $\hat{\rho}^{(AP)}$ for the N synchronization periods, thereby reducing accumulated synchronization errors in each of the N synchronization periods, increasing a time synchronization precision, prolonging each synchronization period, and reducing both a communication overhead of the WIA-PA network and an energy consumption of the node.

2. The clock synchronization frequency offset estimation method adapted to the WIA-PA network according to claim 1, characterized in that when a time synchronization is required to be implemented between the time source device A and the child node P in Step 101, the time source device A is taken as a time reference node, the child node P is a node to be synchronized, and the time synchronization comprises following steps:

A0. generating a beacon frame by a media access control (MAC) layer of a node A, reserving a sending timestamp position in the beacon frame, performing interruption when the node A transmits the beacon frame to a delimiter single frequency dialing (SFD), and adding a sending timestamp into the reserved sending timestamp position in the beacon frame; and periodically broadcasting the beacon frame by the node A through a wireless interface;

A1. receiving the beacon frame by a MAC layer of the child node P, recording a receiving timestamp under SFD interruption and assigning a value to variable $T_{2,i}^{(P)}$, and analyzing the beacon frame to obtain the sending timestamp and assigning a value to variable, wherein $T_{2,i}^{(P)}$ represents a time when the child node P receives the beacon frame, and $T_{1,i}^{(A)}$ represents a time when the time source device A sends the beacon frame;

A2. calculating the time adjustment quantity $\Delta T_i$ by an application layer of the node P according to the formula $\Delta T_i = T_{2,i}^{(P)} - T_{1,i}^{(A)}$, and adjusting an own local time at a subsequent time $T_{5,i}^{(P)}$, by subtracting the adjustment amount $\Delta T_i$ from the current local time to obtain a time as a new time; and A3. repeating Steps A1 and A2, preserving a point $(T_{1,i}^{(A)}, T_{2,i}^{(P)})$ to a corresponding array, and after the N synchronization periods, estimating a frequency offset $\hat{\rho}^{(AP)}$ of the node P relative to the node A by the application layer of the node P according to the frequency offset estimation formula, $$\hat{\rho}^{(AP)} = \frac{\sum_{i=1}^{N} \left[ (T_{2,i}^{(P)} - T_{1,i}^{(A)})(T_{1,i}^{(A)} - T_{2,i-1}^{(P)}) + (T_{2,i}^{(P)} - T_{1,i}^{(A)})^2 \right]}{\sum_{i=1}^{N} \left[ (T_{1,i}^{(A)} - T_{2,i-1}^{(P)})^2 + (T_{2,i}^{(P)} - T_{1,i}^{(A)})(T_{1,i}^{(A)} - T_{2,i-1}^{(P)}) \right]}$$

wherein $T_{1,i}^{(A)}$ is a time when the node A sends an ith beacon frame, $T_{2,i}^{(P)}$ is a time when the node P receives the ith beacon frame, $T_{2,i-1}^{(P)}$ is a time when the node P receives the (i-1)th beacon frame, and N is a number of time synchronization and is a positive integer.

3. The clock synchronization frequency offset estimation method adapted to the WIA-PA network according to claim 2, characterized in that in Step A0, the beacon frame is sent in a broadcast manner, a source address of the beacon frame is an address of the node A, and a time synchronization mechanism of the beacon frame is the time synchronization of a one-way message.

4. The clock synchronization frequency offset estimation method adapted to the WIA-PA network according to claim 2, characterized in that in Step 101, for a first synchronization period, N is 1 and $T_{2,1}^{(P)}$ is expressed as:

$$T_{2,1}^{(P)} = T_{1,1}^{(A)} + \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)})$$

wherein $\rho^{(AP)}$ and $\theta_{t_0}^{(AP)}$ are the relative frequency offset and an initial clock offset at a time $t_0$ respectively, a fixed delay in a beacon frame transceiving process is $d^{(AP)}$, a random delay is $X_i^{(AP)}$, $\rho^{(AP)}(d^{(AP)} + X_1^{(AP)})$ represents a synchronization error accumulated due to the frequency offset in the beacon frame transceiving process, the node P adjusts the local time using a difference value $\Delta T_1 = (T_{2,1}^{(P)} - T_{1,1}^{(A)})$ between the two timestamps at a subsequent time $T_{5,i}^{(P)}$, and the time adjusted by the node P is expressed with $T_{5,1}^{(P)*}$, thereby obtaining $$\Delta T_1 = T_{2,1}^{(P)} - T_{1,1}^{(A)} = \theta_{t_0}^{(AP)} + \rho^{(AP)}(T_{1,1}^{(A)} - t_0) + d^{(AP)} + X_1^{(AP)} + \rho^{(AP)}(d^{(AP)} + X_1^{(AP)}) \quad (1)$$

$$T_{5,1}^{(P)*} = T_{5,1}^{(P)} + T_{2,1}^{(P)} - T_{1,1}^{(A)} \quad (2)$$

in a time from $t_0$ to $T_{5,1}^{(A)}$, a real clock offset quantity $\Delta T_{true,1}$ generated between the node A and the node P is $$\Delta T_{true,1} = \theta_{t_0}^{(AP)} + \rho^{(AP)}(T_{5,1}^{(P)} - t_0) \quad (3)$$

a new clock offset quantity $\theta_{t_1}^{(AP)}$ adjusted by the node P is obtained by (3)-(1) as follows $$\theta_{t_1}^{(AP)} = \Delta T_{true,1} - \Delta T_1 = \rho^{(AP)}(T_{5,1}^{(P)} - T_{1,1}^{(A)}) - (1 + \rho^{(AP)})(d^{(AP)} + X_1^{(AP)}) \quad (4)$$

supposing the time of the node A corresponding to the time $T_{5,1}^{(P)*}$ is $T_{5,1}^{(A)*}$, at this point, the node A and the node P are close in time since the local time of the node P is adjusted, and $T_{5,1}^{(P)*} = T_{5,1}^{(A)*}$ is established to obtain $$T_{2,2}^{(P)} = T_{1,2}^{(A)} + \theta_{t_1}^{(AP)} + \rho^{(AP)}(T_{1,2}^{(A)} - T_{5,1}^{(A)*}) + d^{(AP)} + X_2^{(AP)} + \rho^{(AP)}(d^{(AP)} + X_2^{(AP)})$$

which is substituted into (2) and (4) to obtain $$T_{2,2}^{(P)} - T_{1,2}^{(A)} = \rho^{(AP)}(T_{1,2}^{(A)} - T_{2,1}^{(P)} + X_2^{(AP)} - X_1^{(AP)}) + X_2^{(AP)} - X_1^{(AP)}.$$

* * * * *